United States Patent [19]

Gerkin

[11] Patent Number: 5,489,618

[45] Date of Patent: Feb. 6, 1996

[54] PROCESS FOR PREPARING POLYURETHANE FOAM

[75] Inventor: Richard M. Gerkin, Cross Lanes, W. Va.

[73] Assignee: OSi Specialties, Inc., Danbury, Conn.

[21] Appl. No.: 158,507

[22] Filed: Nov. 29, 1993

[51] Int. Cl.$^6$ .................... C08J 9/08; C08G 18/18
[52] U.S. Cl. .................... 521/128; 521/117; 521/118; 521/129; 521/130; 521/157; 521/164; 521/170; 521/172; 521/173
[58] Field of Search .................... 521/117, 118, 521/129, 130, 157, 170, 172, 173, 128, 164, 128

[56] References Cited

U.S. PATENT DOCUMENTS

| | | | |
|---|---|---|---|
| 3,385,806 | 5/1968 | Critchfield et al. | 521/112 |
| 3,892,687 | 7/1975 | Bechara et al. | 521/118 |
| 3,988,267 | 10/1976 | Bechara et al. | 521/118 |
| 3,993,652 | 11/1976 | Bechara et al. | 252/426 |
| 4,040,992 | 8/1977 | Bechara et al. | 521/117 |
| 4,086,213 | 4/1978 | Bechara et al. | 521/229 |
| 4,101,465 | 7/1978 | Lockwood et al. | 521/118 |
| 4,116,879 | 9/1978 | Bechara et al. | 521/118 |
| 4,165,412 | 8/1979 | Bechara et al. | 521/129 |
| 4,204,062 | 5/1980 | Bechara et al. | 521/129 |
| 4,211,849 | 7/1980 | Kollmeier et al. | 521/164 |
| 4,232,152 | 11/1980 | Bechara et al. | 544/119 |
| 4,286,072 | 8/1981 | McEntire et al. | 521/118 |
| 4,366,084 | 12/1982 | Arbir et al. | 502/167 |
| 4,419,461 | 12/1983 | Arbir et al. | 521/126 |
| 4,421,869 | 12/1983 | Arbir et al. | 521/126 |
| 4,450,246 | 5/1984 | Jachimowicz | 521/129 |
| 4,469,653 | 9/1984 | Nissen et al. | 528/53 |
| 4,563,484 | 1/1986 | Jachimowicz | 521/129 |
| 4,582,861 | 4/1986 | Galla et al. | 521/118 |
| 4,617,286 | 12/1986 | Arai et al. | 521/115 |
| 4,701,474 | 10/1987 | Bailey, Jr. et al. | 521/137 |
| 4,758,605 | 7/1988 | Williams | 521/129 |
| 4,780,485 | 10/1988 | Ashida | 521/118 |
| 4,785,025 | 11/1988 | Galla et al. | 521/118 |
| 4,785,027 | 11/1988 | Brasington et al. | 521/157 |
| 5,179,131 | 1/1993 | Wujcik et al. | 521/130 |
| 5,240,970 | 8/1993 | Nichols et al. | 521/128 |
| 5,288,833 | 2/1994 | Parodi et al. | 521/118 |
| 5,288,864 | 2/1994 | Nichols et al. | 521/130 |
| 5,304,578 | 4/1994 | Tamano et al. | 521/129 |
| 5,308,882 | 5/1994 | Washington | 521/115 |
| 5,321,050 | 6/1994 | Morimoto et al. | 521/108 |

FOREIGN PATENT DOCUMENTS

| | | | |
|---|---|---|---|
| 651638 | 11/1962 | Canada . | |
| 0088377 | 9/1983 | European Pat. Off. | 521/129 |
| 0140480 | 5/1985 | European Pat. Off. . | |
| 0276956 | 8/1988 | European Pat. Off. . | |
| 0361937 | 4/1990 | European Pat. Off. . | |
| 0484749 | 5/1992 | European Pat. Off. . | |
| 0585636 | 3/1994 | European Pat. Off. . | |
| 879167 | 10/1961 | United Kingdom . | |
| 1541593 | 3/1979 | United Kingdom . | |

OTHER PUBLICATIONS

Fondots, "Developments in Amine Catalysts for Urethane Foam", *J. Cellular Plastics*, Oct., 1975, pp. 250–255.

*Primary Examiner*—James J. Seidleck
*Assistant Examiner*—Rabon Sergent
*Attorney, Agent, or Firm*—Banner & Allegretti, Ltd.

[57] ABSTRACT

A process for preparing a polyurethane foam according to the one-shot foaming process by reactions between a polyisocyanate and an active hydrogen-containing component including water and an organic polyol wherein said reactions are conducted in the presence of a salt of a tertiary amine and a carboxylic acid having hydroxyl functionality.

14 Claims, No Drawings

PROCESS FOR PREPARING POLYURETHANE FOAM

BACKGROUND OF THE INVENTION

1. Field of the Invention

The invention relates to a process for producing polyurethane foams using the one-shot foaming process. The invention specifically relates to using a salt of a tertiary amine and a carboxylic acid with hydroxyl functionality as a catalyst for promoting reactions involved in the production of one-shot polyurethanes, particularly flexible polyurethane foams.

2. Background

Polyurethane foams are produced by reacting a polyisocyanate with compounds containing two or more active hydrogens. The active hydrogen-containing compounds are typically polyols, primary and secondary polyamines, and water. Two major reactions take place among these reactants during the preparation of a polyurethane foam. These reactions must proceed simultaneously and at a competitively balanced rate during the process in order to yield a polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between the isocyanate and water. This reaction adds to urethane polymer growth, and is important for producing carbon dioxide gas which promotes foaming. As a result, this reaction often is referred to as the blow reaction.

Both the gel and blow reactions occur in foams blown partially or totally with carbon dioxide gas. In fact, the in-situ generation of carbon dioxide by the blow reaction plays an essential part in the preparation of "one-shot", water blown polyurethane foams. Water-blown polyurethane foams, particularly flexible foams, are produced by both molded and slab foam processes.

In order to obtain a good urethane foam structure, the gel and blow reactions must proceed simultaneously and at optimum balanced rates. For example, if the carbon dioxide evolution is too rapid in comparison with the gel reaction, the foam tends to collapse. Alternatively, if the gel extension reaction is too rapid in comparison with the blow reaction generating carbon dioxide, foam rise will be restricted, thus resulting in a high-density foam. Also, poorly balanced crosslinking reactions will adversely impact foam stability. In practice, the balancing of these two reactions is controlled by the nature of the promoters and catalysts, generally amine and/or organometallic compounds, used in the process.

Flexible and rigid foam formulations usually include a polyol, a polyisocyanate, water, optionally a low boiling (highly volatile) organic blowing agent, a silicone type surfactant, and catalysts. Flexible foams are generally open-celled materials, while rigid foams usually have a high proportion of closed cells.

Generally, catalysts for producing polyurethanes are of two general types: tertiary amines (mono and poly) and organo-tin compounds. Organometallic tin catalysts predominantly favor the gelling reaction; while amine catalysts exhibit a more varied range of blow/gel balance. Using tin catalysts in flexible foam formulations also increases the quantity of closed cells contributing to foam tightness. Tertiary amines also are effective as catalysts for the chain extension reaction and can be used in combination with the organic tin catalysts. For example, in the preparation of flexible slabstock foams, the "one-shot" process has been used wherein triethylenediamine is employed for promoting the water-isocyanate reaction and the cross-linking reaction; while an organic tin compound is used in synergistic combination to promote the chain extension reaction.

Most tertiary amines used for the catalysis of polyurethane foam forming reactions are of the fugitive type. Fugitive amines are designated as such because they do not react into the urethane polymer matrix and remain as low molecular weight compounds in the polymer. Many prior art fugitive amines impart a strong amine odor to the polyurethane foam and may present significant safety problems. The fugitivity of amines results in the emission of fumes from hot foam in both molded foam and slabstock foam processes. Airborne amine vapors can be an industrial hygiene problem in foam production plants. A particular effect of the amine vapor is glaucopsia also known as blue-haze or halovision. It is a temporary disturbance of the clarity of vision. There is increasing demand in the foam production industry for low fugitivity catalysts.

Amines which have a functional group capable of reacting with the isocyanate are available. These amines are bound to the polymer matrix during the reaction. Unfortunately, their catalytic activity normally is limited as compared to the fugitive amines.

Flexible polyurethane foams are commercially prepared as slabstock foam or in molds. Although some slabstock foam is produced by pouring the mixed reactants in large boxes, the predominant industrial process is the continuous production by deposition of the reacting mixture on a paper lined conveyor. The foam rises and cures as the conveyor advances and the foam is cut into large blocks as it exits the foam machine. Some of the uses of flexible slabstock polyurethane foams include: furniture cushions, bedding, and carpet underlay. A particular problem occurs when slabstock foam is produced by the continuous process on a machine with a short conveyor. The formulation has to be highly catalyzed in order to be sufficiently cured when the foam reaches the cutting saw. However, the initiation of the reaction must be delayed to allow uniform laydown of the reacting mixture. In such situations, delayed action catalysts potentially can be used to achieve the required reactivity profile.

The process for making molded foams typically involves the mixing of the starting materials with polyurethane foam production machinery and pouring the reacting mixture, as it exits the mix-head, into a mold. The principal uses of flexible molded polyurethane foams are: automotive seats; automotive headrests and armrests; and also in furniture cushions. Some of the uses of semi-flexible foams include automotive instrument panels, energy managing foam, and sound absorbing foam.

Modern molded flexible polyurethane foam production processes such as those used in Just-in-Time (JIT) supply plants have increased the demand for rapid demold systems. Gains in productivity and/or reduced part cost result from reduced cycle times. Rapid cure High Resilience (HR) molded flexible foam formulations typically achieve demold times of three minutes. This is accomplished by using one or a combination of the following: a higher mold temperature, more reactive intermediates (polyols and/or isocyanate), or increasing the quantity and/or the activity of the catalysts.

High reactivity molded polyurethane systems give rise to a number of problems, however. The fast initiation times require that the reacting chemicals be poured into a mold quickly. In some circumstances a rapid build-up of the viscosity of the rising foam causes a deterioration of its flow properties and can result in defects in the molded parts. Additionally, rapidly rising foam can reach the parting line of the mold cavity before the cover has had the time to close resulting in collapsed areas in the foam. In such situations, delayed action catalysts potentially can be used to improve the initial system flow and allow sufficient time to close the mold.

Another difficulty experienced in the production of molded foams, which is usually worse in the case of rapid cure foam formulations, is foam tightness. Foam tightness is caused by a high proportion of closed cells at the time the molded foam part is removed from the mold. If left to cool in that state, the foam part will generally shrink irreversibly. A high proportion of open cells also are required if the foam is to have the desired high resiliency. Consequently, foam cells have to be opened either by physically crushing the molded part or inserting it in a vacuum chamber. Many strategies have been proposed, both chemical and mechanical, to minimize the quantity of closed cells at demold.

The principal uses of rigid polyurethane foam are: pour-in-place insulation foams for refrigeration applications, transportation applications, and metal doors, boardstock insulation, and sprayed insulation. In rigid foam applications, delayed action catalysts are used for the same reasons needed in flexible foam molding, to delay the initial system reactivity while offering the short cure times required for fast productions cycles.

Delayed action catalysts used in the above-described processes are usually simple amine salts of a tertiary amine and a carboxylic acid such as formic acid, acetic acid, or 2-ethylhexanoic acid (*J. Cellular Plastics*, p. 250–255, September/October, 1975). The salts are not catalytically active and, as a consequence, the amines do not activate the reaction until the salt is dissociated by the increasing temperature of the reacting mixture. Unfortunately, using carboxylic acid blocked amine catalysts generally has a tightening effect on the foam (see U.S. Pat. Nos. 3,385,806, 4,701,474, and 4,785,027).

Delayed action catalysts find their main application in the manufacture of molded flexible polyurethane foam pans. In such applications, it is desirable to make the molding time as short as possible ("rapid demold"), but the onset of the reaction must be delayed so that the viscosity increase accompanying the reaction does not jeopardize proper mold filling.

One problem specific to the use of delayed action, acid-blocked catalysts, i.e., acid-amine salts, is the corrosion caused to the production equipment of the system by such materials. Foam machines usually produce foam by mixing the isocyanate with a mixture of the other components of the formulation either through high pressure impingement or by high speed stirring. The mixture of the ingredients, save the isocyanate, is collectively called the resin. The resin usually includes the polyol, water, silicone surfactant, and the catalysts. Delayed action catalysts are most conveniently incorporated into the resin directly or as a water/amine salt premix. The acid-blocked, amine salt catalysts often cause significant corrosion damage to the mixing and dispensing equipment used in urethane foam manufacture, particularly the pumps and mix-head.

There remains a need in the polyurethane industry for catalysts that have a delayed action; so as to delay the onset of the isocyanate-polyol reaction, referred to as the "initiation time", without adversely impacting the time to complete the reaction or cure, while avoiding some of the other problems common to known delayed action catalysts.

3. Description of Related Art

The use of acid-grafted polyether polyols as reactivity controllers for the production of polyurethane foams is disclosed in U.S. Pat. No. 4,701,474. Such acid-grafted polyether polyols purportedly reduce the reactivity of polyurethane foam formulations without the tightening effect which usually results from using carboxylic acid-amine salts. The number average molecular weight range claimed for the disclosed acid-grafted polyether polyols is 1,000 to 10,000.

Preparing polyurethane foams in the presence of polyether acids is disclosed in U.S. Pat. No. 4,785,027. The polyether acids are mono- or di-acids with the acid functional groups located at the ends of the polymer chains. The polyether chain is built from ethylene and/or propylene oxide to have repeating alkoxy groups. In the case of mono acids, the other terminal group can be an alkyl or hydroxyl function. The presence of the hydroxyl functional group is optional. Such polyether acids purportedly delay the initial reaction rate without increasing foam tightness observed with formic acid-amine salts.

In U.S. Pat. No. 4,366,084 the fuming of dimethylaminopropylamine (DMAPA) is reduced by blocking the amine with phenol. The reduction in fuming increases directly with the percent blocking. According to the patent, using the DMAPA-phenol salts at varied blocking ratios does not cause any deterioration in the air flow and compression set properties of the foam.

U.S. Pat. No. 5,179,131 discloses that the addition of mono- or dicarboxylic acids to polyurethane foam formulations made using polyisocyanate polyaddition polymer poly-dispersions results in a reduction in foam shrinkage. The functional groups attached to the acid are either alkyl or alkylene.

A process for making open-celled crosslinked foams is disclosed in U.S. Pat. No. 4,211,849. The crosslinker is a crystalline polyhydroxy compound having at least 3 hydroxy groups.

The use of the amine salts of tertiary amino-acids as delayed action catalysts in the production of polyurethanes is disclosed in U.S. Pat. No. 4,232,152.

The use of particular N-hydroxyalkyl quaternary ammonium carbonylate salts as delayed action catalysts for the production of polyurethane is disclosed in U.S. Pat. Nos. 4,040,992 and 4,582,861.

The use of particular aliphatic tertiary monoamines, and the carboxylic acid salts thereof as catalysts, in the production of polyurethane foam is disclosed in U.S. Pat. Nos. 4,450,246 and 4,617,286 and in Canadian Pat. 651,638. A variety of organic mono or dicarboxylic acids are disclosed. Canadian Pat. 651,638, in particular, describes preparing polyurethane foams from a isocyanate-terminated polytetramethyleneether or polypropyleneether polyurethane prepolymer and water, in the presence of an acid-amine salt. In certain examples, salts of the hydroxy-acid, citric acid and either N-methyl morpholine and triethylamine are specifically exemplified.

DETAILED DESCRIPTION

The present invention is based on the discovery that the amine salt formed by reaction between a tertiary amine and a carboxylic acid having hydroxyl functional groups ("hydroxy acids") can be used as a delayed action catalyst for producing polyurethane foams using the one-shot foaming process and that the use of such amine salt catalyst offers significant processing advantages over conventional delayed action catalysts.

Use of the amine salts of the "hydroxy acids" in the one-shot foaming technique unexpectedly results in the production of flexible polyurethane foams which either are more open or more easily opened, or both and have a significantly reduced tendency to shrink. Physical properties of foam made using such catalysts, particularly tear resistance, are improved by the use of the hydroxy acid salts. The amine salts prepared from the disclosed hydroxy acids also are much less corrosive than amine salts prepared from the commonly used carboxylic acids, such as formic acid; acetic acid; and 2-ethylhexanoic acid. Additionally, evolution of amine vapors from foams made with the amine salts of the disclosed hydroxy acids is unexpectedly lower than that experienced by foams made with the commonly used amine-acid salts.

This invention relates to a process for making flexible polyurethane foams and rigid polyurethane foams using the one shot foaming approach. In accordance with the present invention, the polyurethane reaction kinetics are controlled by including in the foaming mixture a delayed-action catalyst comprising the amine salt of a tertiary amine and a carboxylic acid having one or more hydroxyl functional groups. The polyurethane manufacturing process of the present invention typically involves the reaction of: an organic polyisocyanate; a polyol generally having a hydroxyl number from about 10 to about 600 and one or more tertiary amine catalysts, at least one of which is the amine salt of a tertiary amine and a hydroxy-carboxylic acid. In addition to the previously indicated materials, flexible foam formulations also generally include: water; an optional organic low boiling auxiliary blowing agent; a silicone surfactant; tin catalyst, and a crosslinker(s) for stabilization or hardening. Rigid foam formulations often contain both a low boiling organic material and water for blowing.

The "one shot foam process" for making polyurethane foam is a one-step process in which all of the ingredients necessary for producing the foamed polyurethane product including the polyisocyanate, the organic polyol, water, catalysts, surfactant optional organic blowing agent and the like are simply blended together, poured onto a moving conveyor or into a mold of a suitable configuration and cured. The one shot process is to be contrasted with the prepolymer process wherein a liquid prepolymer adduct of a polyisocyanate and a polyol normally having terminal isocyanate groups first is prepared in the absence of any foam-generating constituents and then the prepolymer is reacted with water in the presence of catalyst in a second step to form the solid urethane polymer.

Carboxylic acids useful for preparing the amine salts according the subject invention have the general formula:

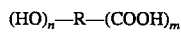

$(HO)_n—R—(COOH)_m$

Where

R is an at least divalent hydrocarbon moiety, typically an at least divalent linear or branched aliphatic hydrocarbon moiety and/or an at least divalent alicyclic or aromatic hydrocarbon moiety.

n is an integer having a value of at least 1 and allows for mono and polyhydroxy substitution on the hydrocarbon moiety.

m is an integer having a value of at least 1 and allows for mono and polycarboxyl substitution on the hydrocarbon moiety.

The "at least divalent hydrocarbon moiety" can be a saturated or unsaturated moiety of 1 to 20 carbon atoms, including a linear aliphatic moiety, a branched aliphatic moiety, an alicyclic moiety or an aromatic moiety. Stated otherwise, R can, for example, be a linear, or branched alkylene group of one to 10 carbon atoms, a cyclic alkylene group of 4 to 10 carbon atoms, or an arylene, an alkarylene, or an aralkylene group of 6 to 20 carbon atoms. Specific non-limiting examples of suitable hydrocarbon moieties are methylene, ethylene, n-propylene, iso-propylene, n-butylene, isobutylene, n-amylene, n-decylene, 2-ethylhexylene, o-, m-, p-phenylene, ethyl-p-phenylene 2,5-naphthylene, p,p'-biphenylene, cyclopentylene, cycloheptylene, xylylene, 1,4-dimethylenephenylene and the like. While above-noted radicals have two available substitution sites, at least one for a carboxyl group and one for a hydroxyl group, it is contemplated that additional hydrogens on the hydrocarbon could be replaced with further hydroxyl and/or carboxyl groups. The following hydroxy acids are illustrative of compounds suitable for practicing the present invention: citric acid, dimethylolpropionic acid, 2-hydroxymethylpropionic acid, salicylic acid, m-hydroxy benzoic acid, p-hydroxyl benzoic acid, dihydroxybenzoic acid, glycolic acid, β-hydroxybutyric acid, cresotic acid, 3-hydroxy-2-naphthoic acid, lactic acid, tartaric acid, malic acid, resorcylic acid, hydroferulic acid and the like. Lactones (cyclic esters) wherein a hydroxyl group and a carboxyl group on the same molecule of the above formula react with one another to form a hydroxy acid suitable for practicing the present invention also can be used. Such lactones include gamma-butyrolactone. Hydroxy-acids useful in the practice of the present invention generally have molecular weights below about 250.

The literature includes many examples of reactive tertiary amine catalysts which potentially can form part of the urethane polymer. The reactive group usually is a hydroxyl function which adds to an isocyanate group. Other functional groups containing active hydrogens also can be considered to achieve that purpose. In contrast to such tertiary amines, the reactive group in the disclosed amine salts of hydroxy-acids is on the acid rather than on the amine.

Tertiary amines used to form an amine salt with the above-described hydroxy-acids can be any of the tertiary amines used for catalyzing the reactions of isocyanate with compounds containing active hydrogens. Suitable tertiary amines include dimethyl benzylamine, trimethylamine, triethanolamine, N-diethylethanolamine, N-methyl pyrrolidone, N-vinyl pyrrolidone, N-methyl morpholine, N-ethyl morpholine, dimethylcyclohexylamine (DMCHA), N,N,N', N", N"'-pentamethyldiethylenetriamine, and the like. Preferred amines include bis(N,N-dimethylaminoethyl)ether and 1,4-diazabicyclo[2.2.2]octane.

By including the amine salt of the present invention in the polyurethane reaction mixture, the initiation of the foaming reaction is delayed. Time to full cure, however, is not adversely affected. Furthermore, several surprising results are obtained when using the disclosed amine salts for making flexible foams using the one-shot foaming process. Certain unexpected advantages realized upon using the amine salts of hydroxy-acids include: significant reduction in the force required to open the cells of flexible foams by mechanical crushing; reduced foam shrinkage; a reduction in the amine vapors given off by the foams and a lower corrosivity towards metals than exhibited by amine salts made with the commonly used carboxylic acids.

The amine salts of the tertiary amines and the hydroxy-acids can be prepared simply by mixing the amine and the acid in a suitable solvent. The amine salts of the hydroxy-acids are rather insoluble in many common liquids and the best solvent identified for such preparations is water. The hydroxy-acid also may be added to the resin premix consisting of all the formulation components except the polyisocyanate for in situ formation of the amine salt in the resin. The addition of the amine salt of the hydroxy-acid to a resin formulation may result in a solution or a stable dispersion. Neutralization of the tertiary amine in the resin premix by the hydroxy-acid is a fast process and the resulting catalytic performance typically is the same as when a preformed salt is added to the resin premix.

Depending on the tertiary amine used in the formulation, the quantity of hydroxy-acid reacted with the amine can be adjusted to achieve the desired reactivity and reactivity profile during polyurethane formulation. Typically, desired catalyst compositions will contain both free amine and bound amine in the form of the amine salt of the hydroxy-acid. Based on acid-base equivalents, the amount of the amine salt generally will be between about 2% to 95% of the total amine equivalents in the formulation. A preferred quantity of amine present as the salt in a resin formulation typically will be between about 2% and 75% of the total tertiary amine content on an equivalents basis and still more preferably, between about 5% and 50%.

Polyols which are useful in the process of the invention for making a polyurethane via the one-shot foaming procedure are any of the types presently employed in the art for the preparation of flexible slabstock foams, flexible molded foams, semi-flexible foams, and rigid foams. The polyols normally can have hydroxyl numbers in the range of about 10 to about 600. The hydroxyl numbers are preferably between about 15 to about 85 for flexible foams and between about 250 and 500 for rigid foams. The hydroxyl number is defined by the equation:

$$OH\# = \frac{56,100 \times f}{m.w}$$

where:

OH #=hydroxyl number of the polyol.

f functionality, that is, the average number of hydroxyl groups per molecule of polyol.

m.w=number average molecular weight of the polyol.

For flexible foams the preferred functionality of the polyols is 2 to 4 and most preferably 2.3 to 3.5. For rigid foams the preferred functionality is 2 to 8 and most preferably 3 to 5.

Polyols which can be used in the process of the present invention, either alone or in admixture, can be of the following non-limiting classes:

a) alkylene oxide adducts of polyhydroxyalkanes;

b) alkylene oxide adducts of non-reducing sugars and sugar derivatives;

c) alkylene oxide adducts of phosphorous and polyphosphorous acids;

d) alkylene oxide adducts of polyphenols;

e) alkylene oxide adducts of primary and secondary amines.

For flexible foams, a preferred class of alkylene oxide adducts of polyhydroxyalkanes are the ethylene oxide and propylene oxide adducts of trihydroxyalkanes. For rigid foams, the preferred class of alkylene oxide adducts are the ethylene oxide and propylene oxide adducts of ammonia, toluene diamine, sucrose, and phenol-formaldehyde-amine resins (Mannich bases).

Polymer polyols are used extensively in the production of flexible foams and are a preferred class of polyols useful in the process of this invention. Polymer polyols are polyols which contain a stable dispersion of a polymer, for example in the polyols a) to e) above and more preferably the polyols of type a). Other polymer polyols useful in the process of this invention are polyurea-polyols and polyoxamate-polyols.

The polyisocyanates which are useful in the process of this invention are organic compounds that contain at least two isocyanate groups. Suitable organic polyisocyanates include the hydrocarbon diisocyanates, (e.g. the alkylenediisocyanates and the arylene diisocyanates) as well as known triisocyanates and polymethylene poly(phenylene isocyanates) also known as polymeric MDI. For flexible and semi-flexible foams, the preferred isocyanates generally are: mixtures of 2,4-tolylene diisocyanate and 2,6-tolylene diisocyanate (TDI) in proportions by weight of 80% and 20% respectively and also 65% and 35% respectively; mixtures of TDI and polymeric MDI, more preferably in the proportion by weight of 80% TDI and 20% of crude polymeric MDI and 50% TDI and 50% crude polymeric MDI; and all polyisocyanates of the MDI type. For rigid foams, the preferred isocyanates are: polyisocyanates of the MDI type and more preferably crude polymeric MDI.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100) [see Oertel, Polyurethane Handbook, Hanser Publishers, New York, N.Y. (1985)]. The Isocyanate Indices in the reaction mixtures used in the process of this invention generally are between 80 and 140. More usually, the Isocyanate Index is: for flexible slabstock foams, typically between 85 and 120; for TDI moulded foams, normally between 90 and 110; for MDI moulded foams, most often between 80 and 100; and for rigid foams, generally between 90 and 130. Some examples of polyisocyanurate rigid forms are produced at indices as high as 250–400.

Water often is used as a blowing agent in both flexible and rigid foams. In the production of flexible slabstock foams, water generally can be used in concentrations of between 2 to 7 parts per hundred parts of polyol (phpp), and more often between 3.5 to 5.5 phpp. Water levels for TDI molded foams normally range from 2 to 6 phpp, and more often between 3 to 5 phpp. For MDI molded foam, the water level is more normally between 2.5 and 4 phpp. Rigid foam water levels range from 0.5 to 5 parts, and more often from 0.5 to 1 phpp.

Blowing agents based on volatile hydrocarbons or halogenated hydrocarbons can also be used in the production of polyurethane foams in accordance with the present invention. A significant proportion of the rigid insulation foam produced is blown with halogenated hydrocarbons. The preferred organic blowing agents for rigid foams are the halogenated hydrocarbons, and more preferably the hydrochlorofluorocarbons (HCFC) and the chlorofluorocarbons (CFC). In the production of flexible slabstock foams, water is the main blowing agent, however, organic blowing agents can be used as auxiliary blowing agents. For flexible slabstock foams, the preferred auxiliary blowing agents are the CFC's and chlorohydrocarbons, and more preferably trichloromonofluorocarbon (CFC 11) and dichloromethane (methylene chloride).

Flexible molded foams typically incorporate less auxiliary blowing agents than slabstock foams although when used the preferred auxiliary blowing agent is CFC 11. The quantity of blowing agent varies according to the desired foam density and foam hardness as recognized by those skilled in this art. The amount of hydrocarbon-type blowing agents used varies between about 2 to 60 parts per hundred parts of polyol (phpp).

Catalysts that can be used for the production of polyurethanes in addition to the amine-hydroxy acid salts of the present invention include tertiary amines of both the non-reactive (fugitive) and reactive types. Reactive amine catalysts are compounds which contain one or more active hydrogens and, as a consequence, can react with the isocyanate and be chemically bound in the polyurethane polymer matrix. For the production of flexible slabstock and molded foams, the preferred amine catalysts are bis(N,N-dimethylaminoethyl)ether and 1,4-diazabicyclo[2.2.2]octane. For the production of rigid foams, the preferred amine catalysts are dimethylcyclohexylamine (DMCHA) and dimethylethanolamine (DMEA).

Organo-metallic catalysts or metal salt catalysts also can and often are used in polyurethane foam formulations. For flexible slabstock foams, the generally preferred metal salt and organo-metallic catalysts are stannous octoate and dibutyltindilaurate respectively. For flexible molded foams, the normally preferred organo-metallic catalysts are: dibutyltindilaurate; and dibutyltindialkylmercaptide. For rigid foams the most often preferred metal salt and organo-metallic catalysts are potassium acetate, potassium octoate and dibutyltindilaurate, respectively. Metal salt or organo-metallic catalysts normally are used in small amounts in polyurethane formulations, typically from about 0.001 phpp to about 0.5 phpp.

Crosslinkers also may be used in the production of polyurethane foams. Crosslinkers are typically small molecules, usually less than 350 gram molecular weight, which contain active hydrogens for reaction with the isocyanate. The functionality of a crosslinker is greater than 3 and preferably between 3 and 5. The amount of crosslinker used can vary between about 0.1 phpp and 20 phpp and the amount used is adjusted to achieve the required foam stabilization or foam hardness. Examples include glycerine, diethanolamine, triethanolamine and tetrahydroxyethylethylenediamine.

Silicone surfactants which may be used in the process of this invention include: "hydrolysable" polysiloxane-polyoxyalkylene block copolymers; "non-hydrolysable" polysiloxane-polyoxyalkylene block copolymers; cyanoalkylpolysiloxanes; alkylpolysiloxanes; polydimethylsiloxane oils. The type of silicone surfactant used and the amount required depends on the type of foam produced as recognized by those skilled in the art. Silicone surfactants can be used as such or dissolved in solvents such as glycols. For flexible slabstock foams the reaction mixture usually contains from 0.3 to 4 phpp of silicone surfactant, and more often from 0.7 to 2.5 phpp. For flexible molded foam the reaction mixture usually contains 0.1 to 5 phpp of silicone surfactant, and more often 0.5 to 2.5 phpp. For rigid foams the reaction mixture usually contains 0.1 to 5 phpp of silicone surfactant, and more often from 0.5 to 3.5 phpp.

Temperatures useful for the production of polyurethanes varies depending on the type of foam and specific process used for production as well understood by those skilled in the art. Flexible slabstock foams are usually produced by mixing the reactants generally at an ambient temperature of between about 20° C. to 40° C. The conveyor on which the foam rises and cures is essentially at ambient temperature, which temperature can vary significantly depending on the geographical area where the foam is made and the time of year. Flexible molded foams usually are produced by mixing the reactants at temperatures between 20° C. and 30° C., and more often between 20° C. and 25° C. The mixed starting materials are fed into a mold typically by pouring. The mold preferably is heated to a temperature between about 35° C. and 70° C., and more often between about 40° C. and 65° C. Sprayed rigid foam starting materials are mixed and sprayed at ambient temperature. Molded rigid foam starting materials are mixed at a temperature in the range of 20° C. to 35° C. The process used for the production of flexible slabstock foams, molded foams, and rigid foams in accordance with the present invention is the "one-shot" process where the starting materials are mixed and reacted in one step.

The basic procedure used to mix the foams for the laboratory evaluations reported hereinafter are:

1. The formulation ingredients are weighed in preparation for sequential addition to an appropriate mixing container.

2. The polyol(s), water, amine catalyst(s), silicone surfactant(s), and crosslinkers (if any) are mixed thoroughly followed by a "degassing" step of prescribed time. After the "degassing" step, additional ingredients can be added such as: an auxiliary blowing agent(s) (if used); and any metal salt catalyst(s) which are sensitive to hydrolysis.

3. The polyisocyanate is added and mixed with the "degassed" ingredients. Specific procedures for the production of slabstock foam and molded foam vary and are summarized as follows:

a) Flexible Molded Foam

Premixes are prepared by weighing the required amounts of polyols, water, crosslinker (diethanolamine), silicone surfactant, and amine catalysts into 2 liter mixing cups. The mixing is done with a 6 blade centrifugal mixing impeller driven at 3400 rpm with a drill press. A stainless steel baffle system is added to the mixing cup to assure high quality mixing. The total mixing process takes approximately 1.5 minutes. The premix is stirred for 1 minute, then allowed to "degas" for 15 seconds, and the pre-weighed quantity of isocyanate is added 7 seconds before the end of the mixing process.

Foam pads are molded in a 38×38×13 cm cast aluminum mold equipped with four 3.2 mm(⅛ in) vent orifices in the cover. Mold release (Chem-Trend RCT-B1208) is applied to the mold which then is preheated to about 75° C. in an oven. After the mold is removed from the oven, it is allowed to cool to about 69° C. at which time the mixing process begins. This results in the foaming mixture being poured into the mold at a temperature of about 65°±1° C. The mold is returned to the oven 90 seconds after pour and removed just before demold which is performed at 6 minutes.

b) Flexible Free-Rise (Slabstock) Foam

Slabstock foam is made in a manner similar to that used in preparing the molded foam. The foaming mixture is poured into a 5 gallon pail and allowed to rise freely.

Test methods used to measure the physical characteristics of the foam produced in the examples are as follows:

| Physical Characteristic | Test Method |
| --- | --- |
| Density | ASTM D 3574 Test A |
| Elongation | ASTM D 3574 Test E |
| IFD | ASTM D 3574 Test B1 |
| Tensile Strength | ASTM D 3574 Test E |
| Tear Resistance | ASTM D 3574 Test F |
| Porosity (Air Flow) | ASTM D 3574 Test G |
| Compression Set | |
| as received | ASTM D 3574 Test $I_1$ |
| humid aging | ASTM D 3574 Test J except conditions: 6h @ 105° C. |
| Exit Time | Exit time is the time elapsed, in seconds, from the end of the mixing process to the first appearance of foam extrusion from any of the four vents of the mold. |
| Force-to-Crush | Force-to-crush (FTC) is the peak force required to deflect a foam pad with the standard 323 $cm^2$ indentor, 1 minute after demold, to 50% of its original thickness. It is measured with a load testing machine using the same setup as that used for measuring foam hardness. A load tester crosshead speed of 50.8 cm/minute is used. |

The terms and abbreviations used in the following examples have the following meaning:

| Term or Abbreviation | Meaning |
| --- | --- |
| Polyol A | A polyalkylene oxide triol, produced propylene-oxide and ethylene oxide and glycerine having a hydroxyl number of about 35 mg KOH/g. The ethylene oxide is present primarily in blocks as a cap for the triol. |
| Polyol B | A polymer polyol based on Polyol A, containing a stable dispersion of acrylonitrile/styrene copolymer, with a hydroxyl number of about 21 mg KOH/G. |
| Polyol C | A polyalkylene oxide triol, produced from propylene oxide and ethylene oxide and glycerine with the ethylene oxide as an internal block and having a hydroxyl number of about 58. |
| K-1 | bis(N,N-dimethylaminoethyl)ether |
| K-2 | 1,4-diazabicyclo[2.2.2]-octane |
| A-1 | Formic acid |
| A-2 | 2,-ethylhexanoic acid |
| HA-1 | bis 2-hydroxymethylpropionic acid |
| HA-2 | citric acid |
| HA-3 | dihydroxybenzoic acid |
| HA-4 | glycolic acid |
| HA-5 | salicylic acid |
| HA-6 | tartaric acid |
| M-1 | Stannous octoate |
| S-1 | A silicone surfactant sold for use in high resiliency foam by OSi Specialties Incorporated as "Y-10366" |
| S-2 | A silicone surfactant sold for use in conventional slabstock foam by OSi Specialties Incorporated as "L-620" |
| BA-1 | Dichloromethane (methylene chloride) |
| TDI | A mixture of 80 wt. % of 2,4-tolylene diisocyanate and 20 wt. % 2,6-tolylene diisocyanate |
| DEOA | Diethanolamine |
| KOH | Potassium hydroxide |
| g | grams |
| mg | milligrams |
| s | seconds |
| min | minute |
| kg | kilograms |
| kPa | kiloPascal |
| m | meter |
| cm | centimeter |
| mm | millimeter |
| ft | foot |
| % | percent by weight |
| phpp | parts per hundred parts by weight of polyol |
| ppm | part per million parts by weight |
| °C. | degree Celsius |
| N | Newton |
| meq | milliequivalent |
| FTC | Force-to-crush (crushing force) |

While the scope of the present invention is defined by the appended claims, the following examples illustrate certain aspects of the invention and, more particularly, describe methods for evaluation. The examples are presented for illustrative purposes and are not to be construed as limitations on the present invention.

EXAMPLES 1–11

Water, DEOA, amine catalysts K-1 and K-2, and acids A-1 or HA-1 were mixed together as a premixed component. For the foams of Examples 2, 3, and 4, the acid was added to the catalyst K-1 before preparation of the premix. For the foam of Example 5, the acid was added to the catalyst K-2 prior to premix preparation. The reaction mixture was mixed and foamed as summarized above. The exit time and the force-to-crush were measured using the procedure described above.

The formulations used and the results obtained are shown in Tables 1 and 2. These formulations are typical for HR (high resilience) molded foam for automotive seating. The formulations in Table 1 are high water and low polymer polyol content (low solids) systems representative of that used for the production of seat-backs. All foams in this Table contain the same quantity of amine catalysts, K-1 and K-2. The foam of Example 1 contains no acid blocker and is the reference (control) foam. The foam of Example 2 contains formic acid. The foams of Examples 3–5 are illustrative of the present invention and contain bis(hydroxymethyl)propionic acid (DMPA) at various concentrations. The reaction is delayed by the use of the amine salt of the hydroxy-acid. These examples show the effect of the hydroxy-acid on the foam exit-time and crushing force (FTC). In the case of the foam of Example 5, the reaction delay is not evident because the amine blocked by the acid in this case is the so-called cure catalyst (K-2), rather than the blow catalyst (K-1). Blocking the cure catalyst has less of an impact on the foam rise time, which is a blow-reaction controlled process.

The lower crushing force of Examples 3–5 relative to Examples 1 and 2 shows that the cells of the foam made according to the process of the present invention are either more open or more easily opened or both. Industry and laboratory experience shows that there is a direct correlation between the mechanical force required to "crush" a foam and the shrinkage that the foam undergoes if not crushed. Consequently, foams exhibiting significantly reduced FTC's statistically shrink less.

The formulations in Table 2 are representative of those used for the production of seat-cushions. The same results and effects observed in Table 1 can also be seen in the results reported in Table 2. Examples 6 and 7 are the controls, while Examples 8–11 illustrate the invention. For the foams of Examples 9, 10, and 11, catalyst K-2 was blocked with DMPA prior to preparation of the water-amine premix.

TABLE 1

| Examples | Formulation, phpp | | | | |
|---|---|---|---|---|---|
| | 1 | 2 | 3 | 4 | 5* |
| Polyol A | 75 | 75 | 75 | 75 | 75 |
| Polyol B | 25 | 25 | 25 | 25 | 25 |
| Water | 4.2 | 4.2 | 4.2 | 4.2 | 4.2 |
| DEOA | 1.5 | 1.5 | 1.5 | 1.5 | 1.5 |
| Catalyst K-1 | 0.07 | 0.07 | 0.07 | 0.07 | 0.07 |
| Catalyst K-2 | 0.117 | 0.117 | 0.117 | 0.117 | 0.117 |
| Acid A-1 | — | 0.030 | — | — | — |
| Hydroxy-acid HA-1 | — | — | 0.029 | 0.059 | 0.022 |
| Surfactant S-1 | 1.0 | 1.0 | 1.0 | 1.0 | 1.0 |
| TDI 80/20 | 52.2 | 52.2 | 52.2 | 52.2 | 52.2 |
| Index | 105 | 105 | 105 | 105 | 105 |
| Density, kg/m$^3$ | 29.7 | 20.6 | 29.6 | 30.4 | 30.3 |
| Exit Time, s | 35 | 39 | 43 | 46 | 34 |
| FTC, N/323 cm$^2$ | 1068 | 1163 | 623 | 267 | 614 |

TABLE 2

| Examples | Formulation, phpp | | | | | |
|---|---|---|---|---|---|---|
| | 6 | 7 | 8 | 9 | 10* | 11 |
| Polyol A | 50 | 50 | 50 | 50 | 50 | 50 |
| Polyol B | 50 | 50 | 50 | 50 | 50 | 50 |
| Water | 3.5 | 3.5 | 3.5 | 3.5 | 3.5 | 3.5 |
| DEOA | 1.3 | 1.3 | 1.3 | 1.3 | 1.3 | 1.3 |
| Catalyst K-1 | 0.07 | 0.07 | 0.07 | 0.07 | 0.07 | 0.07 |
| Catalyst K-2 | 0.10 | 0.10 | 0.10 | 0.10 | 0.10 | 0.10 |
| Acid A-1 | — | 0.030 | — | — | — | — |
| Hydroxy-acid HA-1 | — | — | 0.029 | 0.019 | 0.024 | 0.028 |
| Surfactant S-1 | 1.0 | 1.0 | 1.0 | 1.0 | 1.0 | 1.0 |
| TDI 80/20 | 44.1 | 44.1 | 44.1 | 44.1 | 44.1 | 44.1 |
| Index | 105 | 105 | 105 | 105 | 105 | 105 |
| Density, kg/m$^3$ | 33.4 | 33.5 | 34.3 | 33.5 | 34.6 | 34.8 |
| Exit Time, s | 45 | 48 | 49 | 50 | 51 | 51 |
| FTC, N/323 cm$^2$ | 770 | 792 | 329 | 391 | 289 | 236 |

EXAMPLES 12–14

The foams of these examples were prepared in the same way as those of Examples 1–11. However, the foams were subjected to a 30 minute post-cure at 120° C. after demold. Examples 12 and 13 are controls, while Example 14 is made in accordance with the present invention. The foam pads were conditioned, cut, and tested according to ASTM 3574. The results of the physical property tests are reported in Table 3. As shown, use of the hydroxy-acid results in a significant improvement in the tear resistance of the foam and also an increase in the foam's IFD values. No detrimental effect on any foam properties is observed.

TABLE 3

| Examples | Formulation, phpp | | |
|---|---|---|---|
| | 12 | 13 | 14 |
| Polyol A | 75 | 75 | 75 |
| Polyol B | 25 | 25 | 25 |
| Water | 3.5 | 3.5 | 3.5 |
| DEOA | 1.3 | 1.3 | 1.3 |
| Catalyst K-1 | 0.07 | 0.07 | 0.07 |
| Catalyst K-2 | 0.10 | 0.10 | 0.10 |
| Acid A-1 | — | 0.030 | — |
| Hydroxy-acid HA-1 | — | — | 0.029 |
| Surfactant S-1 | 1.0 | 1.0 | 1.0 |
| TDI 80/20 | 44.2 | 44.2 | 44.2 |
| Index | 105 | 105 | 105 |
| Density, kg/m$^3$ | 33.7 | 34.2 | 34.5 |
| Exit Time, s | 50 | 52 | 54 |
| Porosity, scfm/ft$^2$ | 27.8 | 31.8 | 23.3 |
| IFD, N/323 cm$^2$ | | | |
| @ 25% deflection | 129 | 136 | 153 |
| @ 65% deflection | 307 | 325 | 358 |
| Load Ratio | 2.38 | 2.39 | 2.33 |
| 25% return, % | 86 | 85 | 84 |
| Tensile Strength, kPa | 102 | 108 | 114 |
| Elongation, % | 104 | 110 | 111 |
| Tear Resistance, N/m | 217 | 226 | 249 |
| Compression Set, % | | | |
| As received, C$_d$ | | | |
| @ 50% deflection | 10.6 | 10.3 | 10.3 |
| @ 75% deflection | 9.3 | 9.2 | 9.2 |
| Humid aged, C$_d$ (6h @ 105° C.) | | | |
| @ 50% deflection | 26.6 | 27.3 | 25.4 |

EXAMPLES 15 AND 16

The results of a comparative corrosion study performed with acid A-1 and hydroxy-acid HA-1 are reported in Table 4. The testing was done according to ASTM method G31-72(82). Aqueous solutions 15 and 16 were prepared and used to measure their corrosivity to steel. Three pairs of exposure jars were set-up in order to get corrosion measurements at three different exposure durations, 14, 28, and 119 days. Corrosion was measured by percent weight loss of sample in grams. The results demonstrate that the DMPA amine salt is much less corrosive to steel than the formic acid amine salt.

TABLE 4

|  | Solution | |
|---|---|---|
| Examples | 15 | 16 |
| Water, % | 51.3 | 38.2 |
| Catalyst K-1, % | 26.3 | 23.7 |
| Acid A-1, % | 11.3 | — |
| Acid-A-1, meq/g | 2.46 | |
| Hydroxy-acid HA-1, % | — | 38.2 |
| Hydroxy-acid HA-1, meq/g | — | 2.84 |
| Dipropylene glycol, % | 11.2 | — |
| Corrosion, Steel | | |
| after 14 days, weight loss, % | 0.491 | 0.051 |
| qualitative evaluation | rust in vapor space, etched in liquid | no attack |
| after 28 days, weight loss, % | 2.847 | 0.447 |
| qualitative evaluation | rust in vapor space, etched in liquid | no attack |
| after 119 days, weight loss, % | 10.355 | 0.001 |
| qualitative evaluation | rust in vapor space, heavily etched in liquid, liquid has turned black | no attack |

EXAMPLES 17–20

Amine vapors given off by foams made without any added acid, made with formic acid, made with 2-bis (hydroxymethyl) propionic acid, and made with 2ethylhexanoic acid were measured. Two methods were employed to obtain this measurement: 1) the amine level in the air space over freshly made foam was determined using the Drager tube method; and 2) the amine vapors released from foam after it has cured and cooled was studied by a head-space gas chromatographic (GC) technique.

For the Drager tube method, the amount of urethane foam reaction mixture was adjusted so that it filled about two thirds of a 5 gallon container once the reaction was completed. The reaction mixture was mixed, added to a container fitted with a polyethylene seal, and the foam allowed to rise. Just after blow-off, a small cut was made in the seal and a Drager tube (Amine Test, #8101061) on a Model 31 Drager hand pump was inserted at just above the level of the foam. A gas sample was taken, the tube removed and the cut sealed with tape. Additional gas samples were taken at various time intervals. The length of color change of the tube is indicative of the quantity of amine present in the air space above the foam. The reduction in amine vapor given off by fresh foam when the dihydroxy acid is used is shown by the results in Table 5 (Amines, by Drager tube).

The amine vapors given off as the foam is heated were analyzed using a head space gas chromatographic (GC) method. Samples of each foam were sealed into bottles and the individual bottles heated to 70, 100, and 130° C. for 1, and 2 hours respectively. The vapors in the bottles were sampled and analyzed by GC for amine content (catalyst K-1). The foam of Example 19, made with the hydroxy-acid (DMPA) is shown to release significantly less amine vapor at any given temperature. This result is obtained despite the fact that this foam contains an elevated level of potentially "extractable" amine.

TABLE 5

|  | Formulation, phpp | | | |
|---|---|---|---|---|
| Examples | 17 | 18 | 19 | 20 |
| Polyol C | 100 | 100 | 100 | 100 |
| Water | 5.5 | 5.5 | 5.5 | 5.5 |
| Catalyst K-1 | 0.053 | 0.050 | 0.051 | 0.050 |
| Acid A-1 | — | 0.021 | — | — |
| Acid A-2 | — | — | — | 0.089 |
| Hydroxy-acid HA-1 | — | — | 0.085 | — |
| Catalyst M-1 | 0.23 | 0.23 | 0.23 | 0.23 |
| Surfactant S-2 | 1.0 | 1.0 | 1.0 | 1.0 |
| Blowing agent BA-1 | 10 | 10 | 10 | 10 |
| TDI 80/20 | 66.3 | 66.3 | 66.3 | 66.3 |
| Index | 107 | 107 | 107 | 107 |
| Cream time, s | 19 | 21 | 24 | 19 |
| Blow-off time, s | 123 | 130 | 130 | 114 |
| Maximum height, cm | 23.1 | 23.7 | 24.5 | 24.3 |
| Top collapse, cm | 0.22 | 0.22 | 0.21 | 0.22 |
| Amines, by Drager Tube | | | | |
| @ t = 0 min., mm | 8 | 10 | 4–5 | 6–7 |
| @ t = 10 min., mm | 4 | 4 | 0–1 | 2–3 |
| @ t = 20 min., mm | 1 | 1 | 0 | 0–1 |
| Amine (liquid extraction) | | | | |
| Catalyst K-1, ppm | 165 | 231 | 222 | 156 |
| Amine (headspace analysis) | | | | |
| @ 70° C. for 1 h (K-1), ppm | 3.5 | 3.7 | 0.6 | 0.6 |
| @ 100° C. for 1 h (K-1), ppm | 45 | 50 | 5.3 | 12 |
| @ 130° C. for 2 h (K-1), ppm | 70 | 103 | 26.5 | 34.3 |

EXAMPLES 21–26

Formulations using several different amine salt catalysts were mixed and tested using the same procedures described in connection with Examples 1–11. Formulation 21 does not use any hydroxy-acid catalyst and serves as a control. Hydroxy-acids HA-2, -3, -4, -5, and -6 are representatives of hydroxy-acids of the present invention. The quantity of hydroxy-acid, in equivalents, is the same for each of the hydroxy-acids used. The lower crushing force resulting from the use of the hydroxy-acids in the formulations in shown in Table 6.

TABLE 6

|  | Formulation, phpp | | | | | |
|---|---|---|---|---|---|---|
|  | 21 | 22 | 23 | 24 | 25 | 26 |
| Polyol A | 75 | 75 | 75 | 75 | 75 | 75 |
| Poylol B | 25 | 25 | 25 | 25 | 25 | 25 |
| Water | 4.2 | 4.2 | 4.2 | 4.2 | 4.2 | 4.2 |

TABLE 6-continued

| | Formulation, phpp | | | | | |
|---|---|---|---|---|---|---|
| | 21 | 22 | 23 | 24 | 25 | 26 |
| DEOA | 1.5 | 1.5 | 1.5 | 1.5 | 1.5 | 1.5 |
| Catalyst K-1 | 0.07 | 0.07 | 0.07 | 0.07 | 0.07 | 0.07 |
| Catalyst K-2 | 0.117 | 0.117 | 0.117 | 0.117 | 0.117 | 0.117 |
| Hydroxy-acid HA-2 | — | 0.020 | — | — | — | — |
| Hydroxy-acid HA-3 | — | — | 0.047 | — | — | — |
| Hydroxy-acid HA-4 | — | — | — | 0.023 | — | — |
| Hydroxy-acid HA-5 | — | — | — | — | 0.042 | — |
| Hydroxy-acid HA-6 | — | — | — | — | — | 0.023 |
| Surfactant S-1 | 1.0 | 1.0 | 1.0 | 1.0 | 1.0 | 1.0 |
| TDI 80/20 | 51.9 | 51.9 | 51.9 | 51.9 | 51.9 | 51.9 |
| Index | 105 | 105 | 105 | 105 | 105 | 105 |
| Density, kg/m$^3$ | 30.1 | 30.6 | 30.4 | 30.5 | 30.3 | 30.7 |
| Exit Time, s | 33 | 32 | 36 | 35 | 35 | 34 |
| FTC, N/323 cm$^2$ | 1200 | 660 | 420 | 570 | 430 | 760 |

The delayed-action catalysts of the present invention are simple amine salts of tertiary amines and carboxylic acids, wherein the carboxylic acids contain hydroxyl functional groups (hydroxy-acids). The hydroxy-acids contain a hydrocarbon moiety, particularly linear or branched aliphatic and/or aromatic hydrocarbon moieties, having one (1) or more hydroxyl group(s) and one (1) or more carboxylic acid group(s). Preferred hydroxy-acids will have 2 to 3 hydroxyl groups and 1 to 2 carboxylic acid groups. Suitable hydroxy-acids include: bis 2-hydroxymethylpropionic acid (dimethylolpropionic acid); citric acid; salicylic acid, glycolic acid and the like.

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

I claim:

1. In a process for preparing a polyurethane foam according to the one-shot foaming process by reactions between a polyisocyanate and an active hydrogen-containing component including water and an organic polyol in the presence of a catalyst, a surfactant and optional crosslinker, the improvement comprising conducting said reactions in the presence of a salt which consists of a tertiary amine reacted with a carboxylic acid having hydroxyl functionality as a catalyst; wherein the tertiary amine is selected from the group consisting of bis (N,N-dimethylaminoethyl)ether; 1,4-diazabicyclo[2.2.2]octane and mixtures thereof, and wherein the carboxylic acid has the formula:

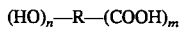

$(HO)_n-R-(COOH)_m$ wherein R is an at least divalent hydrocarbon moiety having 1 to 20 carbon atoms, m and n are integers each separately having a value of at least 1.

2. The process of claim 1 wherein said hydrocarbon moiety is selected from the group consisting of a linear aliphatic hydrocarbon moiety, a branched aliphatic hydrocarbon moiety, an alicyclic aliphatic hydrocarbon moiety and an aromatic hydrocarbon moiety.

3. The process of claim 2 wherein said carboxylic acid having hydroxyl functionality is selected from the group consisting of citric acid, dimethylolpropionic acid, 2-hydroxymethylpropionic acid, salicylic acid, m-hydroxy benzoic acid, p-hydroxyl benzoic acid, glycolic acid, β-hydroxybutyric acid, cresotic acid, 3-hydroxy-2-naphthoic acid, lactic acid, tartaric acid, malic acid, resorcylic acid, hydroferulic acid and mixtures thereof.

4. The process of claim 3 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

5. The process of claim 1 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

6. In a process for preparing a polyurethane foam according to the one-shot foaming process by reactions between a polyisocyanate and an active hydrogen-containing component including water and an organic polyol in the presence of a catalyst, a surfactant and optional crosslinker, the improvement comprising conducting said reactions in the presence of a salt which consists of a tertiary amine reacted with a carboxylic acid having hydroxyl functionality as a catalyst, said salt being present in an amount sufficient to reduce foam shrinkage; wherein the tertiary amine is selected from the group consisting of bis (N,N-dimethylaminoethyl) ether; 1,4-diazabicyclo[2.2.2]octane and mixtures thereof, and wherein the carboxylic acid has the formula:

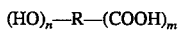

$(HO)_n-R-(COOH)_m$ wherein R is an at least divalent hydrocarbon moiety having 1 to 20 carbon atoms, m and n are integers each separately having a value of at least 1.

7. The process of claim 6 wherein said hydrocarbon moiety is selected from the group consisting of a linear aliphatic hydrocarbon moiety, a branched aliphatic hydrocarbon moiety, an alicyclic aliphatic hydrocarbon moiety and an aromatic hydrocarbon moiety.

8. The process of claim 7 wherein said carboxylic acid having hydroxyl functionality is selected from the group consisting of citric acid, dimethylolpropionic acid, 2-hydroxymethylpropionic acid, salicylic acid, m-hydroxy benzoic acid, p-hydroxyl benzoic acid, glycolic acid, β-hydroxybutyric acid, cresotic acid, 3-hydroxy-2-naphthoic acid, lactic acid, tartaric acid, malic acid, resorcylic acid, hydroferulic acid and mixtures thereof.

9. The process of claim 8 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

10. The process of claim 6 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

11. In a process for preparing a polyurethane foam according to the one-shot foaming process by reactions between a polyisocyanate and an active hydrogen-containing component including water and an organic polyol in the presence of a catalyst, a surfactant and optional crosslinker, the improvement comprising conducting said reactions in the presence of a salt which consists of a tertiary amine reacted with a carboxylic acid having hydroxyl functionality as a catalyst, said salt being present in an amount sufficient to reduce the force needed to mechanically crush the foam; wherein the tertiary amine is selected from the group consisting of bis (N,N-dimethylaminoethyl) ether; 1,4,-diazabicyclo[2.2.2]octane, and mixtures thereof, and wherein the carboxylic acid has the formula:

$(HO)_n-R-(COOH)_m$ wherein R is an at least divalent hydrocarbon moiety having 1 to 20 carbon atoms, m and n are integers each separately having a value of at least 1.

12. The process of claim 11 wherein said hydrocarbon moiety is selected from the group consisting of a linear aliphatic hydrocarbon moiety, a branched aliphatic hydrocarbon moiety, an alicyclic aliphatic hydrocarbon moiety and an aromatic hydrocarbon moiety.

13. The process of claim 12 wherein said carboxylic acid having hydroxyl functionality is selected from the group consisting of citric acid, dimethylolpropionic acid, 2-hydroxymethylpropionic acid, salicylic acid, m-hydroxy benzoic acid, p-hydroxyl benzoic acid, glycolic acid, β-hydroxybutyric acid, cresotic acid, 3-hydroxy-2-naphthoic acid, lactic acid, tartaric acid, malic acid, resorcylic acid, hydroferulic acid and mixtures thereof.

14. The process of claim 11 wherein said reactions are conducted in the presence of a polyurethane foam additive selected from the group consisting of an amine catalyst, an organo-metallic catalyst, a metal salt catalyst, a crosslinker, a silicone surfactant, an organic blowing agent and mixtures thereof.

* * * * *